United States Patent
Hayashi

(10) Patent No.: US 11,607,844 B2
(45) Date of Patent: Mar. 21, 2023

(54) TREATMENT AGENT FOR ADDITIVE MANUFACTURING APPARATUS

(71) Applicant: TOKYO PRINTING INK MFG. CO., LTD., Tokyo (JP)

(72) Inventor: Katsuhiko Hayashi, Saitama (JP)

(73) Assignee: TOKYO PRINTING INK MFG. CO., LTD., Tokyo (JP)

(*) Notice: Subject to any disclaimer, the term of this patent is extended or adjusted under 35 U.S.C. 154(b) by 628 days.

(21) Appl. No.: 16/338,575

(22) PCT Filed: Oct. 2, 2017

(86) PCT No.: PCT/JP2017/035768
§ 371 (c)(1),
(2) Date: Apr. 1, 2019

(87) PCT Pub. No.: WO2018/066491
PCT Pub. Date: Apr. 12, 2018

(65) Prior Publication Data
US 2019/0224915 A1 Jul. 25, 2019

(30) Foreign Application Priority Data

Oct. 4, 2016 (JP) .............................. JP2016-196075

(51) Int. Cl.
| | | |
|---|---|---|
| *B29C 64/188* | (2017.01) | |
| *C08K 3/013* | (2018.01) | |
| *C08K 5/353* | (2006.01) | |
| *C08L 33/06* | (2006.01) | |
| *C08L 25/14* | (2006.01) | |
| *B29C 64/40* | (2017.01) | |
| *C08L 101/06* | (2006.01) | |
| *C08L 33/14* | (2006.01) | |
| *B33Y 40/20* | (2020.01) | |
| *B29K 509/00* | (2006.01) | |
| *B29K 433/04* | (2006.01) | |
| *B29K 635/00* | (2006.01) | |
| *B29K 25/00* | (2006.01) | |
| *B29K 33/00* | (2006.01) | |
| *B33Y 10/00* | (2015.01) | |

(52) U.S. Cl.
CPC ............ *B29C 64/188* (2017.08); *B29C 64/40* (2017.08); *B33Y 40/20* (2020.01); *C08K 3/013* (2018.01); *C08K 5/353* (2013.01); *C08L 25/14* (2013.01); *C08L 33/06* (2013.01); *C08L 33/14* (2013.01); *C08L 101/06* (2013.01); *B29K 2025/08* (2013.01); *B29K 2033/08* (2013.01); *B29K 2033/12* (2013.01); *B29K 2433/08* (2013.01); *B29K 2433/12* (2013.01); *B29K 2509/00* (2013.01); *B29K 2635/00* (2013.01); *B29K 2995/0096* (2013.01); *B33Y 10/00* (2014.12)

(58) Field of Classification Search
CPC .................................................... B29C 64/188
See application file for complete search history.

(56) References Cited

U.S. PATENT DOCUMENTS

| | | | |
|---|---|---|---|
| 5,503,785 | A | 4/1996 | Crump |
| 6,067,480 | A | 5/2000 | Stuffle |
| 6,070,107 | A | 5/2000 | Lombardi |
| 6,228,923 | B1 | 5/2001 | Lombardi |
| 6,437,034 | B2 | 8/2002 | Lombardi |
| 8,980,150 | B2 | 3/2015 | Oshima |
| 9,556,346 | B2 | 1/2017 | Suzuki |
| 9,790,382 | B2 | 10/2017 | Suzuki |
| 9,796,863 | B2 | 10/2017 | Suzuki |
| 10,100,168 | B2 | 10/2018 | Bayer |
| 2001/0025073 | A1 | 9/2001 | Lombardi |
| 2009/0295032 | A1 | 12/2009 | Hopkins |
| 2013/0234370 | A1 | 9/2013 | Suzuki |
| 2013/0244040 | A1 | 9/2013 | Oshima |
| 2016/0144535 | A1 | 5/2016 | Touma |
| 2016/0263826 | A1 | 9/2016 | Suzuki |
| 2016/0264796 | A1 | 9/2016 | Suzuki |
| 2016/0333165 | A1 | 11/2016 | Bayer |
| 2017/0022341 | A1 | 1/2017 | Bayer |
| 2017/0232684 | A1 | 8/2017 | Yoshimura |

FOREIGN PATENT DOCUMENTS

| | | |
|---|---|---|
| JP | H09024552 A | 1/1997 |
| JP | 2002516346 A | 6/2002 |
| JP | 2004059601 A | 2/2004 |
| JP | 2010521339 A | 6/2010 |
| JP | 2011245712 A | 12/2011 |
| JP | 2012111226 A | 6/2012 |
| JP | 2013184405 A | 9/2013 |
| JP | 2015214045 A | 12/2015 |
| JP | 2016053220 | 4/2016 |
| JP | 2016078284 A | 5/2016 |
| JP | 2016097588 A | 5/2016 |
| WO | 2015108770 A1 | 7/2015 |

OTHER PUBLICATIONS

Definition of the word "introduced" found at https://www.thefreedictionary.com/introduced on Apr. 4, 2022.*
International Search Report dated Dec. 5, 2017 filed in PCT/JP2017/035768.

* cited by examiner

*Primary Examiner* — Arrie L Reuther
(74) *Attorney, Agent, or Firm* — Rankin, Hill & Clark LLP

(57) ABSTRACT

According to the present invention, there is provided a treatment agent for an additive manufacturing apparatus including a resin having an oxazoline group.

16 Claims, No Drawings

TREATMENT AGENT FOR ADDITIVE MANUFACTURING APPARATUS

TECHNICAL FIELD

The present invention relates to a treatment agent for an additive manufacturing apparatus, which is used for an additive manufacturing apparatus.

BACKGROUND ART

From the related art, an additive manufacturing apparatus which manufactures a three-dimensional modeled object (hereinafter, referred to as an additive manufactured object) based on three-dimensional design data has been known in the art. As an additive manufacturing method in such an additive manufacturing apparatus, a vat photo polymerization method, a powder bed fusion method, a material extrusion method, a slurry layer manufacturing method, a material jetting method, and the like are proposed, productized, and commercially available.

Patent Document 1 discloses an optical additive manufacturing resin composition including: (A) urethane (meth) acrylate having at least one amide group in a molecule, (B) urethane (meth)acrylate other than the component (A), which has at least four (meth)acryloyl groups in a molecule, (C) a compound other than the components (A) and (B), which has an ethylenically unsaturated bond having a cyclic structure, and (D) a photopolymerization initiator, and proposes that tensile strength and elongation characteristics after curing are excellent and heat resistance thereof becomes favorable.

Patent Document 2 discloses a three-dimensional modeling method in which a joining body that forms each layer of a three-dimensional modeled object is formed on each of a plurality of powder material layers having an uncured powder material, based on data on a layer shape corresponding to each powder material layer, and a joining body that forms each layer of a modeled object support member is formed thereon, and proposes that breakage during formation or removal of a modeled object is suppressed.

Patent Document 3 discloses an additive manufacturing apparatus in which a planar powder material is supplied so as to be deposited in a vertical direction, a coagulating liquid that coagulates the powder material is discharged to the supplied powder material to coagulate the powder material, and layers of a formed material are laminated to be manufactured into a solid object, the apparatus including: a manufacturing stage to which the powder material is supplied in a planar shape; and a lifting member which is disposed on the manufacturing stage before a powder material that forms the solid object is supplied, and is provided with an opening through which the powder material in an uncoagulated state can pass, in which after layers of the forming material are laminated to form a solid object, when the lifting member is separated from the manufacturing stage, the solid object in a state of being buried in the powder material in a non-coagulated state is extracted, and proposes that in a case where a solid object is formed by laminating layers obtained by selectively coagulating powder materials, it is possible to safely extract a solid object after formation of a solid object without causing a defect from occurring in the solid object.

Patent Document 4 discloses a method that constructs a three-dimensional object by using a lamination and deposition system using extrusion, the method including: delivering a filament of a modified acrylonitrile-butadiene-styrene (ABS) material that requires a driving pressure of less than or equal to approximately 6.9 megapascals when extruded at a maximum liquefier temperature from a standard form liquefier at an extrusion rate of 16.4 microliters per second, to an extrusion head of the lamination and deposition system using extrusion; melting the modified ABS material in the extrusion head; and depositing the melted modified ABS material on layer by layer, and proposes that a response time of the extrusion head for depositing a construction material improves.

Patent Document 5 discloses slurry to be manufactured which forms a manufactured object with granules, the slurry to be manufactured including: an aqueous solvent; hydrophobic granules that form the manufactured object; an amphiphilic solid polymer that forms the manufactured object and is dissolved in the aqueous solvent; and a defoaming agent that suppresses foaming of the aqueous solvent, and proposes that scattering of granules is suppressed.

Patent Document 6 discloses an additive manufacturing material forming an optically manufactured article in an ink jet optical manufacturing method, including a curable resin component having a weighted average value of an SP value of 9.0 to 10.3, and proposes the followings. (1) Swelling deformation due to water or moisture absorption during photocuring of the manufacturing material and after curing thereof is extremely small. (2) A photo-cured material of a support material is excellent in water solubility and easy to be removed after the optical manufacturing. (3) In a two-component photocurable resin composition, a support material is not compatible with a manufacturing material, and the optically manufactured article has excellent mechanical property. (4) The optically manufactured article formed by using the two-component photocurable resin composition is excellent in manufacturing accuracy. (5) A method of manufacturing the optically manufactured article is excellent in productivity.

Although additive manufacturing apparatuses such as those in Patent Documents 1 to 6 are known, in an additive manufacturing apparatus using an additive manufacturing method excluding a powder lamination method of Patent Documents 2 and 3, a resin as a material of an additive manufactured object and a manufacturing head are moved, and the resin is discharged onto a base (also referred to as a stage, a table, and the like) for additive manufacturing and laminated to produce an additive manufactured object. In this case, the discharged resin may shrink when deposited on the base and cured (solidified), to be shifted in position during formation of an additive manufactured or may warp and be separated from the base.

On the other hand, if the discharged resin adheres strongly to the base, the base may warp due to the shrinkage and there is a concern of contact with the manufacturing head. In addition, since the adherence is strong, it becomes difficult to perform detachment after manufacturing. If rigidity of the base is enhanced, the warpage of the manufactured object is suppressed. However, if the adherence is strong, it is difficult to perform detachment as well and there is a risk of breaking the base due to trying to detach it forcedly.

In order to solve this, the followings are proposed.

Patent Document 7 discloses a manufacturing table for a three-dimensional modeling apparatus, the table including: a foundation table having predetermined rigidity; and a flexible table which is detachably attached on the foundation table, is configured to form a manufactured object on a surface, and has flexibility, in which the foundation table includes an adjustment mechanism that adjusts a planar state of the flexible table, and proposes that the warpage of the manufactured object is difficult to occur and it is possible to detach the manufactured object easily.

Patent Document 7 is a modeling table for a three-dimensional modeling apparatus, but it is possible to take out a modeled object in a manner that the foundation table and the flexible table are formed in a two-stage structure, the modeled object is formed on the flexible table, and after the formation of the modeled object, the flexible table is taken out from the foundation table together with the modeled object and the flexible table is bent.

However, since the modeling table is special, it is difficult to install the modeling table easily in existing additive manufacturing apparatus. Also, it is necessary to detach the flexible table after the formation of the modeled object. It is necessary to fix the detached flexible table to the foundation table each time when another modeled object is formed, and in this case, it takes time and effort to confirm whether it is level.

Therefore, in the additive manufacturing apparatus, a treatment agent, which adheres to both a base of the apparatus and an additive manufactured object to be modeled, and can prevent from the shifting in position or warpage thereof, as well as can be easily separated from the base and also easily removed from the additive manufactured object after manufacturing of the additive manufactured object, is desired.

RELATED DOCUMENT

Patent Document

[Patent Document 1] Japanese Unexamined Patent Publication No. 2004-59601
[Patent Document 2] Japanese Unexamined Patent Publication No. 2013-184405
[Patent Document 3] Japanese Unexamined Patent Publication No. 2015-214045
[Patent Document 4] PCT Japanese Translation Patent Publication No. 2010-521339
[Patent Document 5] Japanese Unexamined Patent Publication No. 2011-245712 [Patent Document 6] Japanese Unexamined Patent Publication No. 2012-111226
[Patent Document 7] Japanese Unexamined Patent Publication No. 2016-97588

SUMMARY OF THE INVENTION

Technical Problem

Therefore, an object of the present invention is to provide a treatment agent for an additive manufacturing apparatus which adheres, in an additive manufacturing apparatus, to both a base of the apparatus and an additive manufactured object to be manufactured, and can prevent from the shifting in position or warpage thereof, as well as can be easily separated from the base and also easily removed from the additive manufactured object after manufacturing of the additive manufactured object.

Solution to Problem

As a result of intensive studies, the present inventors found that the object can be achieved by using a treatment agent for an additive manufacturing apparatus, including a resin having an oxazoline group, and completed the present invention.

That is, the present invention provides a treatment agent for an additive manufacturing apparatus, including a resin having an oxazoline group.

In an embodiment, the resin having an oxazoline group is a resin having at least two 2-oxazoline groups in a molecule.

In an embodiment, the resin having an oxazoline group is water-soluble.

In an embodiment, the treatment agent for an additive manufacturing apparatus further includes a filler.

In an embodiment, the filler is at least one of an inorganic filler and an organic filler.

The present invention also provides a treatment coating film which is used for forming an additive manufactured object including a resin having cure (solidification) shrinkage, the treatment coating film including a resin having an oxazoline group.

In an embodiment, the treatment coating film further includes a filler.

In an embodiment, the resin having an oxazoline group is water-soluble.

In an embodiment, the treatment coating film is water-soluble.

The present invention also provides a method of using a treatment agent for an additive manufacturing apparatus, including interposing the treatment agent for an additive manufacturing apparatus between a base and an additive manufactured object, in an additive manufacturing apparatus that models an additive manufactured object, to bond the base and the additive manufactured object.

The present invention also provides a method of using a treatment agent for an additive manufacturing apparatus, including: interposing the treatment agent for an additive manufacturing apparatus between a base and an additive manufactured object, in an additive manufacturing apparatus that models an additive manufactured object, to bond the base and the additive manufactured object; and separating the treatment agent for an additive manufacturing apparatus from the base and the additive manufactured object by treating and dipping the treatment agent for an additive manufacturing apparatus with a water-soluble solvent.

The present invention also provides a separating method by which a bonded portion where a base and an additive manufactured object are bonded using the treatment agent for an additive manufacturing apparatus, the method including treating and dipping the bonded portion with a water-soluble solvent.

The present invention also provides a method of manufacturing an additive manufactured object, including: a coating step of coating a base with the treatment agent for an additive manufacturing apparatus to form a coating layer; a step of drying the coating layer to form a treatment layer; a step of laminating an additive manufacturing resin over the treatment layer to obtain an additive manufactured object; and a step of separating the additive manufactured object from the base and the treatment layer.

In an embodiment, the step of separating the additive manufactured object from the base and the treatment layer includes a step of dissolving the treatment layer in a water-soluble solvent.

Advantageous Effects of Invention

According to the present invention, it is possible to provide a treatment agent for an additive manufacturing apparatus which adheres, in an additive manufacturing apparatus, to both a base of the apparatus and an additive manufactured object to be modeled, and can prevent from shifting in position or warpage thereof during manufacturing, and can easily separate the additive manufactured object from the base and also easily removed from the additive manufactured object after modeling of the additive manufactured object.

DESCRIPTION OF EMBODIMENTS

Hereinafter, an embodiment of the present invention will be described in detail. The present embodiment is merely an embodiment of the present invention. The present invention is not limited by the present embodiment, and various modifications and embodiments are possible within the scope not departing from the gist of the present invention.

The treatment agent for an additive manufacturing apparatus of the treatment agent for an additive manufacturing apparatus (hereinafter, simply referred to as "treatment agent") of the prevent invention preferably includes a resin having an oxazoline group.

The resin having an oxazoline group is preferably a resin having at least two 2-oxazoline groups in a molecule. Examples thereof include a polymer such as 2-vinyl-2-oxazoline, 5-methyl-2-vinyl-2-oxazoline, 4,4-dimethyl-2-vinyl-2-oxazoline, 4,4-dimethyl-2-vinyl-5,6-dihydro-4H-1,3-oxazine, and 4,4,6-trimethyl-2-vinyl-5,6-dihydro-4H-1,3-oxazine. More specifically, examples thereof include poly(2-ethyl-2-oxazoline), poly(2-methyl-2-oxazoline), poly(2-propyl-2-oxazoline), poly(2-butyl-2-oxazoline), poly(2-phenyl-2-oxazoline), and the like which have a 2-oxazoline group, and resins obtained by introducing a 2-oxazoline group into an acrylic resin and a styrene/acrylic resin. These can be used alone and two or more kinds thereof can be used by being mixed. The resin having an oxazoline group is preferably water-soluble. Since such a water-soluble resin having an oxazoline group can be dissolved in a water-soluble solvent to be described below, the resin can be provided as a treatment agent in a liquid form capable of coating a base.

Examples of commercially available products of the above-described resin having an oxazoline group include PEOX (manufactured by Dow Chemical Company), EPOCROS (manufactured by Nippon Shokubai Co., Ltd.), and AQUAZOL (manufactured by Polymer Chemistry Innovations).

The resin having an oxazoline group is contained in the treatment agent for an additive manufacturing apparatus, in a solid content of preferably 1% to 99% by mass, more preferably 1% to 70% by mass, and further preferably 2% to 60% by mass. When it is less than 1% by mass, sufficient adherence cannot be obtained. When it is more than 99% by mass, it is difficult to coat a base and it is difficult to separate the additive manufactured object without damage.

The treatment agent for an additive manufacturing apparatus of the present invention preferably further contains a filler.

The filler is preferably at least one of an inorganic filler and an organic filler. Examples of the inorganic filler include titanium oxide, calcium carbonate, barium sulfate, talc, zinc oxide, synthetic amorphous silica, mica, montmorillonite, smectite, zeolite, and kaolinite. Examples of the organic filler include resin particles such as a urethane resin, a (meth)acrylic resin, a nitrile resin, and a polystyrene resin, or waxes such as polyethylene, polypropylene, microcrystalline, carnauba, and polytetrafluoroethylene, and include a mixture thereof. Among these, synthetic amorphous silica and (meth)acrylic resin particles are preferable, and the synthetic amorphous silica is further preferable. These can be used alone and two or more kinds thereof can be used by being mixed.

In a case where a resin having an oxazoline group or a water-soluble resin other than the resin having an oxazoline group is used in combination, the filler is preferably 0 to 200 parts by mass and more preferably 10 to 100 parts by mass, with respect to a total 100 parts by mass of these. When it is within the ranges, surface smoothness of the treatment coating film and the adhesion to and separability from the additive manufactured object become favorable and a stable additive manufactured object can be formed.

An average particle diameter of the filler is preferably 100 µm or less, and is preferably within a range of 0.01 to 10 µm. When it is larger than 100 µm, coating applicability is inferior. The average particle diameter referred to here is a measurement value obtained by a laser method (MICROTRAC 9320×100, manufactured by Honeywell).

In addition, the treatment agent for an additive manufacturing apparatus of the present invention may contain a water-soluble resin other than the resin having an oxazoline group. The water-soluble resin is preferably one or more selected from a polyvinyl alcohol resin, a cellulose resin, a resin having an ether bond, a resin having a carbamoyl group, a resin having an anionic functional group, a resin having a cationic functional group, a polysaccharide, gums, gelatins, and the like.

In a case where the resin having an oxazoline group and the water-soluble resin are used in combination, these are contained in the treatment agent for an additive manufacturing apparatus, in a solid content of preferably 1% to 99% by mass, more preferably 1% to 70% by mass, and further preferably 2% to 50% by mass, in total.

Specific examples of the polyvinyl alcohol resin include polyvinyl alcohol (PVA), acetoacetyl modified polyvinyl alcohol, cation modified polyvinyl alcohol, anion modified polyvinyl alcohol, silanol modified polyvinyl alcohol, and polyvinyl acetal.

Examples of the cellulose resin include methyl cellulose (MC), ethyl cellulose (EC), hydroxyethyl cellulose (HEC), carboxymethyl cellulose (CMC), ethyl hydroxyethyl cellulose, hydroxypropyl cellulose (HPC), hydroxyethyl methylcellulose, hydroxypropyl methylcellulose (HPMC), hydroxybutyl methylcellulose, carboxymethyl ethylcellulose, dihydroxypropyl cellulose, hydroxypropyl hydroxyethyl cellulose, benzyl cellulose, phenyl cellulose, chlorodeoxycellulose, aminodeoxycellulose, diethyl ammonium chloride hydroxyethyl cellulose, hydroxypropyl trimethyl ammonium chloride hydroxyethyl cellulose, diethylaminoethylcellulose, carboxymethyl cellulose sodium, carboxymethyl hydroxyethyl cellulose sodium, cellulose sodium sulfate, hydroxypropylmethylcellulose phthalate, hydroxypropylmethylcellulose acetate succinate, hydroxypropyl cellulose acetate, an ester of hydroxyethyl cellulose and diallyldimethylammonium chloride, an ester of hydroxyethyl cellulose and 2-hydroxypropyl trimethyl ammonium chloride, and an ester of hydroxyethyl cellulose and lauryldimethylammonium-substituted epoxide.

Specific examples of the resin having an ether bond include polyethylene oxide (PEO) and polypropylene oxide (PPO), and a mixture or a block copolymer thereof, polyethylene glycol (PEG), polyvinyl ether (PVE), and polyvinyl methyl ether.

Specific examples of the resin having a carbamoyl group include polyacrylamide (PAAM), polydimethylacrylamide, poly(N-isopropylacrylamide), polyvinylpyrrolidone (PVP), polyvinylacetamide, polyamide imide, and polyacrylic acid hydrazide.

Specific examples of the resin having an anionic functional group include emulsion latex such as a styrene-butadiene polymer, an acrylonitrile-butadiene polymer, a methyl methacrylate-butadiene polymer, polychloroprene, a vinyl pyridine copolymer, polyisoprene, butyl rubber, polysulfide rubber, polyurethane resin, polybutene, acrylic resin, a vinyl chloride polymer, a vinyl acetate polymer, a vinylidene chloride copolymer, polyethylene resin, and vinyl acetate-ethylene copolymer, or emulsion or colloidal dispersion such as alkyd resin, acrylated alkyd resin, epoxidized alkyd resin, polyester resin, styrene-acrylic resin, epoxy resin, and a fluorine resin.

Specific examples of the resin having a cationic functional group include polyethyleneimine and polyallylamine.

Specific examples of the polysaccharide include chitins such as n-carboxymethyl chitin, chitosans, starches such as starch, cationic starch, hydroxypropyl starch, hydroxyethyl starch, and acetoacetyl modified starch, dextrans such as carboxymethyl dextran, diethylaminoethyl dextran, and aminodextran, agaroses, xanthans, carrageenans, alginic acid and alginate, pectins, and guar gum such as tamarind gum, gellan gum, tamarind seed gum, psyllium seed gum, tara gum, locust bean gum, guaran, carboxymethyl hydroxyalkyl guar, and cationic guar.

Specific examples of the gums include guar gums such as gum arabic, karaya gum, carboxymethyl hydroxyalkyl guar, and cationic guar.

Among these, the resin having a carbamoyl group and the resin having a cationic functional group are preferable, and polyvinyl pyrrolidone, polyethylene imine, water-soluble nylon, and polyamide imide are further preferable. These can be used alone and two or more kinds thereof can be used by being mixed.

The treatment agent of the present invention can include a water-soluble solvent, a coloring material, an antifoaming agent, a leveling agent, an anti-blocking agent, wax, a pigment dispersant, an antistatic agent, a slip agent, a plasticizer, a tackifier, an antioxidant, a photopolymerization initiator, a photosensitizer, a polymerization inhibitor, a surfactant, an ultraviolet absorber, a surface conditioner, an antifoaming agent, a pH adjusting agent, a charge imparting agent, fungicide, deodorant, a wetting agent, an anti-skinning agent, and a metal chelating agent, for the purpose of improving required physical properties such as smoothness of a treated surface and hue, stability, or coating applicability. Any known conventional one can appropriately be selected in a range not impairing printability and characteristics of the treatment agent for an additive manufacturing apparatus.

The water-soluble solvent can be contained for the purpose of improving the surface smoothness of the treatment coating film which is coated with the treatment agent. In a case of where the resin having an oxazoline group or the water-soluble resin other than the resin having an oxazoline group is used in combination, it is preferably 0 to 10,000 parts by mass, with respect to a total 100 parts by mass of these. When it is more than 10,000 parts by mass, the treatment coating film becomes too thin, which causes adhesion to decrease.

Examples of the water-soluble solvent include water, polyhydric alcohol solvents such as ethylene glycol, diethylene glycol, triethylene glycol, tetraethylene glycol, propylene glycol, polyethylene glycol, polypropylene glycol, and glycerin, alcohol solvents such as methanol, ethanol, 1-propanol, 2-propanol, isopropanol, 1-butanol, 2-butanol, isobutanol, tert-butanol, and pentyl alcohol, and congener alcohols thereof, allyl alcohol, 2-methyl-1-propanol, 3-methyl-1-butyne-3-ol, 2-methoxyethanol, ethylene glycol monomethyl ether acetate, and other higher alcohols, ketone solvents such as acetone, methyl ethyl ketone, methyl butyl ketone, and methyl isobutyl ketone, glycol ether solvents such as ethylene glycol monomethyl ether, ethylene glycol monoethyl ether, propylene glycol monomethyl ether, 3-methoxybutanol, 3-methoxy-3-methylbutanol, diethylene glycol monoethyl ether, diethylene glycol monobutyl ether, diethylene glycol monohexyl ether, propylene glycol ether, dipropylene glycol ether, and triethylene glycol ether, glycol ester solvents such as propylene glycol laurate, ether solvents such as tetrahydrofuran, 1,4-dioxane and 1,2-dimethoxyethane, diol solvents such as butanediol, and pentanediol, hexanediol, and congener diols thereof, lactones such as γ-butyrolactone, nitrogen-containing heterocyclic compounds such as 2-pyrrolidone, N-methylpyrrolidone, N-ethylpyrrolidone, N-(2-hydroxyethyl)pyrrolidone, N-methyloxazolidinone, and N-ethyloxazolidinone, sulfolane, dimethylformamide, and glycerin, and derivatives thereof. Among these, the methanol, the ethanol, the isopropanol, the ethylene glycol monomethyl ether, the ethylene glycol monomethyl ether, and the like are preferable. The ethanol, the isopropanol, and the like are further preferable. These can be used alone and two or more kinds thereof can be used by being mixed.

As the coloring material, a pigment or a dye or a mixture thereof can be contained. Examples of the pigment include inorganic pigments such as titanium oxide, rubber handle, barium sulfate, calcium carbonate, silica, zinc oxide, zinc sulfide, mica, talc, pearl, aluminum, and carbon black, and organic pigments such as phthalocyanine type, insoluble azo type, condensed azo type, dioxazine type, anthraquinone type, quinacridone type, perylene type, perinone type, and thioindigo type, other various fluorescent pigments, a metal powder pigment, and an extender pigment. One kind of these pigments may be used, or two or more kinds thereof may be used in combination. As the dye, a dye dissolved or dispersed in water or the water-soluble solvent is preferable, and one kind may be used or two or more kinds thereof may be used in combination. Among these, it is preferable to use the pigment, from a viewpoint of durability. Since the coloring material can be contained, it is extremely useful in terms of color variation.

When forming an additive manufactured object, the treatment agent of the present invention is used as a treatment coating film of the additive manufactured object.

Specifically, the treatment coating film of the present invention is a treatment coating film which is used for forming an additive manufactured object including a resin having cure (solidification) shrinkage. The treatment coating film preferably includes the resin having an oxazoline group.

The treatment coating film is preferably disposed between a base in the additive manufacturing apparatus and an additive manufactured object. Further, after the additive manufactured object is formed, it is preferably separated from the base and the additive manufactured object.

The resin having cure (solidification) shrinkage, which is used for forming an additive manufactured object refers to a resin that decreases in volume and shrinks when a resin in a liquid form due to application of heat or the like is changed into a solid form. A rate of shrinkage is called shrinkage rate. Examples of the resin having cure (solidification) shrinkage and the shrinkage rate includeacrylonitrile-butadiene-styrene copolymer resin (ABS resin, shrinkage rate: 4/1000 to 9/1000), polylactic acid resin (PLA resin, shrinkage rate: 3/1000 to 5/1000), polystyrene resin (PS resin, shrinkage rate: 4/1000 to 7/1000), acrylonitrile styrene resin (AS resin, shrinkage rate: 2/1000 to 7/1000), polyvinyl chloride rigid resin (PVC rigid resin, shrinkage rate: 1/1000 to 5/1000), polycarbonate resin (PC resin, shrinkage rate: 5/1000 to 7/1000), ethylene vinyl acetate copolymer (EVA copolymer, shrinkage rate: 7/1000 to 12/1000), high density polyethylene resin (HDPE resin, shrinkage rate: 20/1000 to 60/1000), polyacetal resin (POM resin, shrinkage rate: 20/1000 to 25/1000), polyethylene terephthalate resin (PET resin, shrinkage rate: 2/1000 to 4/1000), nylon 6 resin (PA 6 resin, shrinkage rate: 5/1000 to 15/1000), nylon 66 resin (PA 66 resin, shrinkage rate: 8/1000 to 15/1000), and polypropylene resin (PP resin, shrinkage rate: 10/1000 to 25/1000). Among these, as the resin having cure (solidification) shrinkage, which is used for forming an additive manufactured object, the acrylonitrile-butadiene-styrene copolymer resin (ABS resin), the polylactic acid resin (PLA resin), polypropylene resin (PP resin), and the like are used.

The resin having an oxazoline group, to be contained in the treatment coating film makes adhesion with the base favorable and adhesion when forming the additive manufactured object also favorable. Since the treatment coating film has flexibility by containing the resin having an oxazoline group, the cure (solidification) shrinkage of the resin used for the additive manufactured object when forming the additive manufactured object is absorbed, warpage of the base can be suppressed, and separation due to warpage of the additive manufactured object can be suppressed. Further, the resin having an oxazoline group imparts separability to the treatment coating film.

The resin having an oxazoline group, to be contained in the treatment coating film is preferably a resin having at least two 2-oxazoline groups in a molecule. Examples thereof include a polymer such as 2-vinyl-2-oxazoline, 5-methyl-2-vinyl-2-oxazoline, 4,4-dimethyl-2-vinyl-2-oxazoline, 4,4-dimethyl-2-vinyl-5,6-dihydro-4H-1,3-oxazine, and 4,4,6-trimethyl-2-vinyl-5,6-dihydro-4H-1,3-oxazine. More specifically, examples thereof include poly(2-ethyl-2-oxazoline), poly(2-methyl-2-oxazoline), poly(2-propyl-2-oxazoline), poly(2-butyl-2-oxazoline), poly(2-phenyl-2-oxazoline), and the like which have a 2-oxazoline group, and resins obtained by introducing a 2-oxazoline group into an acrylic resin and a styrene/acrylic resin. These can be used alone and two or more kinds thereof can be used by being mixed. The resin having an oxazoline group, to be contained in the treatment coating film is preferably water-soluble.

Also, the treatment coating film may also contain a water-soluble resin other than the resin having an oxazoline group. The water-soluble resin is preferably one or more selected from a polyvinyl alcohol resin, a cellulose resin, a resin having an ether bond, a resin having a carbamoyl group, a resin having an anionic functional group, a resin having a cationic functional group, a polysaccharide, gums, gelatins, and the like. Among these, the resin having a carbamoyl group and the resin having a cationic functional group are preferable, and polyvinyl pyrrolidone, polyethylene imine, water-soluble nylon, and polyamide imide are further preferable. These can be used alone and two or more kinds thereof can be used by being mixed.

Further, the treatment coating film of the present invention preferably includes a filler.

The filler contained in the treatment coating film makes separability favorable, without loading the base and the additive manufactured object.

Since separation can be easily performed from both the base and the additive manufactured object by containing the filler, damage to the base and damage to the additive manufactured object can be suppressed. Also, by coating with and dipping in water-soluble solvent, the treatment coating film containing the resin having an oxazoline group is dissolved therein and it can be easily removed.

The filler is preferably at least one of an inorganic filler and an organic filler. Examples of the inorganic filler include titanium oxide, calcium carbonate, barium sulfate, talc, zinc oxide, synthetic amorphous silica, mica, montmorillonite, smectite, zeolite, and kaolinite. Examples of the organic filler include resin particles such as a urethane resin, a (meth)acrylic resin, a nitrile resin, and a polystyrene resin, or waxes such as polyethylene, polypropylene, microcrystalline, carnauba, and polytetrafluoroethylene, and include a mixture thereof. Among these, synthetic amorphous silica and (meth)acrylic resin particles are preferable, and the synthetic amorphous silica is further preferable. These can be used alone and two or more kinds thereof can be used by being mixed.

A thickness of the treatment coating film is only required to cover at least a surface of the base at a position on the base where the additive manufactured object is formed and it is not necessary to have a strictly constant thickness. The treatment coating film can be formed by filling and coating a sponge head bottle container (also referred to as a sponge cap container, a foaming rubber application container, or the like), a roll-on container, or the like with the treatment agent for an additive manufacturing apparatus, filling a spray bottle, a spray container, or the like with the same and spraying the same, or performing coating using a brush or the like or placing the same over the base in a sufficient amount and scrapping it off with a squeegee or the like. The thickness is not particularly limited, but is preferably within a range of approximately 0.01 to 100 µm.

The treatment agent for an additive manufacturing apparatus is interposed between a base and an additive manufactured object, in the additive manufacturing apparatus that models an additive manufactured object for the purpose of bonding the base and the additive manufactured object each other.

Examples of a method of interposing the treatment agent for an additive manufacturing apparatus between the base and the additive manufactured object include a method of coating the base with the treatment agent for an additive manufacturing apparatus.

As the coating method, a sponge head bottle container (also referred to as a sponge cap container, a foaming rubber application container, or the like), a roll-on container, or the like may be filled and coated with the treatment agent for an additive manufacturing apparatus; a spray bottle, a spray container, or the like may be filled with the same to spray it, or coating may be performed using a brush or the like or the treatment agent may be placed on the base in a sufficient amount and scrapped off with a squeegee or the like, as long as it forms a coating film form between the base and the additive manufactured object. Therefore, the treatment agent for an additive manufacturing apparatus is not necessary to have a strictly constant thickness, as long as a certain degree of coating film can be formed on the base. In addition, it is preferably dried before forming an additive manufactured object. It may be natural drying, but it is preferably dried by heating.

In a case of heating, the base may be heated, but it may also be heated by blowing hot air. A heating temperature and a heating time are not particularly limited, as long as the treatment agent may be dried to form a coating film form. For example, heating may be performed at a temperature of approximately 70 to 150° C. for several seconds to several tens seconds.

When using the treatment agent for an additive manufacturing apparatus of the present invention, the base and the additive manufactured object can be closely contacted with each other by interposing the treatment agent for an additive manufacturing apparatus therebetween, and warpage of the base due to shrinkage due to curing (solidifying) when forming the additive manufactured object or warpage at the time of forming the additive manufactured object can be suppressed.

Further, the treatment agent for an additive manufacturing apparatus can be used for easily separating the additive manufactured object from the base by lifting the additive manufactured object upward after forming the additive manufactured object. In a case where it is difficult to easily separate from the base by merely lifting the additive manufactured object upward, the base and the additive manufactured object can be separated from each other by applying a water-soluble solvent to the bonded portion between the base and the additive manufactured object or dipping the boned portion between the base and the additive manufactured object into a water-soluble solvent, and dissolving the treatment agent in the water-soluble solvent.

The water-soluble solvent is preferably water or an alcohol solvent. From the viewpoint of working environment, the water is further preferable.

As a separation method by which the bonded portion that was bonded by using the treatment agent for an additive manufacturing apparatus is separated, a separation method in which the base and the additive manufactured object are separated by lifting the additive manufactured object upward, from the treatment agent for an additive manufacturing apparatus, which forms a coating film form obtained by bonding the base and the additive manufactured object. In the separation method by lifting the additive manufactured object upward, in a case where easy separation is difficult, a separation method in which the base and the additive manufactured object are separated by applying a water-soluble solvent to the bonded portion between the base and the additive manufactured object or dipping the bonded portion into a water-soluble solvent, may be used.

According to the separation method, a bonded portion to the treatment agent for an additive manufacturing apparatus can be easily separated off without damaging the base and the additive manufactured object.

The water-soluble solvent is preferably water or an alcohol solvent, and the water is further preferable.

The base and the additive manufactured object are easily separated from the treatment agent for an additive manufacturing apparatus, in a coating film form, by lifting the additive manufactured object upward. In addition, in a case where separating is difficult by merely lifting upward, it becomes easy to perform separation from the base and the additive manufactured object and further it is possible to perform complete removal by wiping or the like, by treating the treatment agent for an additive manufacturing apparatus in a coating film form with the water-soluble solvent or by dipping the treatment agent into the water-soluble solvent and dissolving the treatment agent for an additive manufacturing apparatus in the water-soluble solvent. Accordingly, it is possible to perform separating without damaging the base and the additive manufactured object and wiping becomes also easy. Therefore, since no treatment agent for an additive manufacturing apparatus remains in the base and the additive manufactured object and there is also no influence on the bonded portion to which the treatment agent for an additive manufacturing apparatus was adhered, the base is kept clean and a clean additive manufactured object is obtained.

A method of manufacturing an additive manufactured object preferably includes a coating step of coating a base with the treatment agent for an additive manufacturing apparatus to form a coating layer, a step of drying the coating layer to form a treatment layer, a step of laminating an additive manufacturing resin over the treatment layer to obtain an additive manufactured object, and a step of separating the additive manufactured object from the base and the treatment layer.

The coating step is preferably a formation step by a step of directly coating the base with a treatment agent for an additive manufacturing apparatus, but may also be a formation step by a coating step using a sponge head bottle container (also referred to as a sponge cap container, a foamed rubber application container, and the like), a coating step using a roll-on container, a spraying step using a spray bottle or a spray container, and a step of placing the treatment agent over the base in a sufficient amount and scraping it off using a squeegee or the like.

In the step of forming the treatment layer, the coating layer may be dried, and the heating method is not particularly limited. It may be a natural drying, the base may be heated, but it may also be heated by blowing hot air. A heating temperature and a heating time are not particularly limited, as long as the coating layer may be dried to form a coating film form. However, heating may be performed at a temperature of approximately 70 to 150° C. for several seconds to several tens seconds.

The step of obtaining the additive manufactured object may be a formation step based on the specification of the additive manufacturing apparatus to be used.

The step of separating the additive manufactured object from the base and the treatment layer is preferably a separation step by lifting the additive manufactured object. However, in a case where separation is difficult by merely lifting upward, a separation step by treating the treatment layer with the water-soluble solvent or dipping the treatment layer into the water-soluble solvent and dissolving the treatment layer may also be used.

For the coating with the water-soluble solvent, a coating method such as brush coating or spraying is not particularly limited, and may be directly sprinkled or submerged in the liquid. When performing treating with water-soluble solvent, the treatment layer is dipped in the water-soluble solvent and the treatment layer dissolves to be separated therefrom.

The treatment agent for an additive manufacturing apparatus can be manufactured by a known method by uniformly dissolving or dispersing the resin having an oxazoline group, a filler, a water-soluble solvent, a coloring material, and various additives. For the dissolving and the dispersing, various agitators or dispersers such as a dissolver, roll mill, ball mill, bead mill, sand mill, attritor, paint shaker, agitator, Henschel mixer, colloid mill, pearl mill, ultrasonic homogenizer, wet jet mill, a kneader, and a homomixer. One kind of these devices may be used, or two or more kinds thereof may be used in combination. When bubbles or coarse particles are contained in the treatment agent, coating applicability or adhesion, and separability deteriorate. Therefore, it is preferable to remove them using a known filtering machine, a centrifugal separator, or the like.

Viscosity of the treatment agent for an additive manufacturing apparatus is not particularly limited, as long as it is within a range not hindering the coating. When considering manufacturing suitability, handling, container to be used, and the like, it is preferably 1 to 10,000 mPa·s at 25° C. In this case, it can be measured using a commercially available viscometer such as a Brookfield viscometer or a cone and plate viscometer. In addition, it may also be a semisolid form.

EXAMPLES

Hereinafter, the present invention will be described more specifically with reference to Examples and Comparative Examples, but the present invention is not limited thereto. In Examples and Comparative Examples, the part(s) indicates part(s) by mass and "%" indicates % by mass.

[Preparation of Treatment Agent for Additive Manufacturing Apparatus]

Examples 1, 2, and 9 to 11, Comparative Examples 1, 2, and 9

A resin (500) having an oxazoline group (solid content of 39%, EPOCROS WS-500, manufactured by Nippon Shokubai Co., Ltd.) was used as the treatment agent of Example 1. Similarly, the resin (500) having an oxazoline group was changed to a resin (700) having an oxazoline group (solid content of 25%, EPOCROS WS-700, manufactured by Nippon Shokubai Co., Ltd.), and this was used as the treatment agent of Example 2. Similarly, treatment agents of Comparative Examples 1 and 2 were prepared, according to the formulation in Table 1. Similarly, treatment agents of Examples 9 to 11 and Comparative Example 9 were prepared, according to the formulation in Table 2.

Examples 3 to 6 and 12, and Comparative Examples 3 to 8

50 parts of water and 2 parts of silica 1 were charged in 50 parts of the resin (500) having an oxazoline group, and the mixture was kneaded and mixed with a paint shaker to prepare a treatment agent of Example 3. Similarly, treatment agents of Examples 4 to 6 and Comparative Example 3 to 8 were prepared, according to the formulation in Table 1. Similarly, a treatment agent of Example 12 was prepared, according to the formulation in Table 2.

Example 7 and Comparative Example 8

40 parts of colloidal silica were charged in 60 parts of the resin (500) having an oxazoline group, and mixed and stirred with a paint shaker to prepare a treatment agent of Example 7. Similarly, the resin (500) having an oxazoline group was changed to the resin (700) having an oxazoline group, and this was used as the treatment agent of Example 8.

Used materials are as follows.

Resin (500) having an oxazoline group: EPOCROS WS-500 (a resin solution obtained by introducing a 2-oxazoline group into an acrylic resin (water, 1-methoxy-2-propanol mixed solution), solid content of 39%, weight average molecular weight of 70,000, number average molecular weight of 20,000, oxazoline group amount of 4.5 mmol/g (solid), manufactured by Nippon Shokubai Co., Ltd.)

Resin (700) having an oxazoline group: EPOCROS WS-700 (aqueous resin solution obtained by introducing a 2-oxazoline group into an acrylic resin, solid content of 25%, weight average molecular weight of 40,000, number average molecular weight of 20,000, oxazoline group amount of 4.5 mmol/g (solid), manufactured by Nippon Shokubai Co., Ltd.)

Oxazoline polymer: Aquazol 5 (solid content of 99.9%, weight average molecular weight of 5,000, manufactured by Polymer Chemistry Innovations)

Polyvinylpyrrolidone (K30): PITZCOL K30 (solid content 95%, molecular weight of 45,000, manufactured by DKS Co. Ltd.)

Water-soluble nylon: AQ nylon A90 (solid content of 100%, manufactured by Toray Industries, Inc.)

Polyamide imide: Vylomax HR-16NN (solid content of 14%, molecular weight of 30,000, manufactured by Toyobo Co., Ltd.)

Polyethylene imine: Epomin P-1000 (solid content of 30%, molecular weight of 70,000, manufactured by Nippon Shokubai Co., Ltd.)

Vinyl chloride-vinyl acetate resin: VINNOL E15/45M (molecular weight of 15,000, manufactured by Wacker Chemie)

Silica 1: AEROSIL 200 (manufactured by Nippon Aerosil Co., Ltd.)

Silica 2: ACEMATT OK412 (manufactured by Evonik Japan Co., Ltd.)

Acrylic beads: Techpolymer MBX-5 (spherical fine particles of crosslinked polymethyl methacrylate, average particle size of 5 μm, manufactured by Sekisui Plastics Co., Ltd.)

Colloidal silica: IPA-ST-L (solid content of 30%, isopropyl alcohol solution, particle diameter of 40 to 50 nm, manufactured by Nissan Chemical Industries, Ltd.)

TABLE 1

| | Example 1 | Example 2 | Example 3 | Example 4 | Example 5 | Example 6 | Example 7 | Example 8 |
|---|---|---|---|---|---|---|---|---|
| Resin (500) having oxazoline group | 100 | | 50 | | 50 | | 60 | |
| Resin (700) having oxazoline group | | 100 | | 50 | | 50 | | 60 |
| Oxazoline polymer | | | | | | | | |
| Polyvinylpyrrolidone (K30) | | | | | | | | |
| Water-soluble nylon | | | | | | | | |
| Polyamide imide | | | | | | | | |
| Polyethyleneimine | | | | | | | | |
| Vinyl chloride-vinyl acetate resin | | | | | | | | |

TABLE 1-continued

|  | | | | | | | | |
|---|---|---|---|---|---|---|---|---|
| Silica 1 | | | 2 | 10 | | | | |
| Silica 2 | | | | | | | | |
| Acrylic beads | | | | 2 | 10 | | | |
| Colloidal silica | | | | | | | 40 | 40 |
| Isopropyl alcohol | | | | | | | | |
| Ethanol | | | | | | | | |
| Water | | | 50 | 50 | 50 | 50 | | |
| Toluene | | | | | | | | |
| Solid content % | 39.0 | 25.0 | 21.1 | 14.2 | 26.8 | 20.5 | 35.4 | 27.0 |
| Surface smoothness | A | B | A | A | A | A | A | A |
| Adhesion to additive manufactured object (ABS) | A | A | A | A | A | A | A | A |
| Adhesion to additive manufactured object (PLA) | A | A | A | A | A | A | A | A |
| Adhesion to additive manufactured object (PP) | A | A | A | A | A | A | A | A |
| Separability from additive manufactured object (ABS) | B | B | A | A | A | A | A | A |
| Separability from additive manufactured object (PLA) | B | B | A | A | A | A | A | A |
| Separability from additive manufactured object (PP) | B | B | A | A | A | A | A | A |
| Water washability | A | A | A | A | A | A | A | A |

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Resin (500) having oxazoline group | | | | | | | | |
| Resin (700) having oxazoline group | | | | | | | | |
| Oxazoline polymer | | | | | | | | |
| Polyvinylpyrrolidone (K30) | 10 | | 10 | 10 | | | | |
| Water-soluble nylon | | 10 | | | 10 | | 10 | 10 |
| Polyamide imide | | | | | | 5 | | |
| Polyethyleneimine | | | | | | 5 | | |
| Vinyl chloride-vinyl acetate resin | | | | | | | | |
| Silica 1 | | | 2 | 10 | | | | |
| Silica 2 | | | | | | | | |
| Acrylic beads | | | | 2 | 10 | 10 | 10 | |
| Colloidal silica | | | | | | | | |
| Isopropyl alcohol | | | | | | | 10 | 100 |
| Ethanol | | | | | | | | |
| Water | 100 | 100 | 100 | 100 | 100 | 100 | 100 | |
| Toluene | | | | | | | | |
| Solid content % | 9.1 | 9.1 | 10.7 | 10.7 | 16.7 | 16.7 | 15.4 | 16.7 |
| Surface smoothness | B | B | A | A | A | A | A | A |
| Adhesion to additive manufactured object (ABS) | C | C | C | C | C | C | C | C |
| Adhesion to additive manufactured object (PLA) | A | A | A | A | A | A | A | A |
| Adhesion to additive manufactured object (PP) | A | C | C | C | C | C | C | C |
| Separability from additive manufactured object (ABS) | — | — | — | — | — | — | — | — |
| Separability from additive manufactured object (PLA) | B | B | A | A | A | A | A | A |
| Separability from additive manufactured object (PP) | — | — | — | — | — | — | — | — |
| Water washability | A | A | A | A | A | A | A | A |

TABLE 2

| | Example 9 | Example 10 | Example 11 | Example 12 | Comparative Example 9 |
|---|---|---|---|---|---|
| Resin (500) having oxazoline group | 100 | | | 50 | |
| Resin (700) having oxazoline group | | 100 | 100 | | |
| Oxazoline polymer | 30 | 30 | | | |
| Polyoxazoline (Aquazol) | | | | | |
| Polyvinylpyrrolidone (K30) | | | | | |
| Water-soluble nylon | | | | | |
| Polyamide imide | | | | | |
| Polyethyleneimine | | | | | |
| Vinyl chloride-vinyl acetate resin | | | | | 10 |
| Silica 1 | | | | | |
| Silica 2 | | | | 2 | |
| Acrylic beads | | | | | |
| Colloidal silica | | | | | |
| Isopropyl alcohol | | | | | |
| Ethanol | | 10 | | | |
| Water | | | | 50 | |
| Toluene | | | | | 100 |
| Solid content % | 53.1 | 42.3 | 22.7 | 21.1 | 9.1 |
| Surface smoothness | A | B | A | A | A |
| Adhesion to additive manufactured object (ABS) | A | A | A | A | A |
| Adhesion to additive manufactured object (PLA) | A | A | A | A | A |
| Adhesion to additive manufactured object (PP) | A | A | A | A | |
| Separability from additive manufactured object (ABS) | B | B | B | A | C |
| Separability from additive manufactured object (PLA) | B | B | B | A | C |
| Separability from additive manufactured object (PP) | B | B | B | A | C |
| Water washability | A | A | A | A | C |

In each treatment agent for an additive manufacturing apparatus of Examples 1 to 12 and Comparative Examples 1 to 9, surface smoothness, adhesion to an additive manufactured object, separability from an additive manufactured object, and water washability were evaluated to be shown in Tables 1 and 2.

<Surface Smoothness>

For each treatment agent for an additive manufacturing apparatus of Examples 1 to 12 and Comparative Examples 1 to 9, a several drops were dropped over a base, uniformed using a squeegee, applied to base, and naturally dried to prepare a treatment coating film. In this case, a thickness of the treatment coating film was generally 10 μm. A state of a surface of the treatment coating film was visually observed and evaluated. When the state of the surface of the coating film was uniform with no unevenness, it was determined that the surface smoothness was favorable. When the surface smoothness was favorable, a surface of the layer formed first of the additive manufactured object to be modeled over the treatment coating film (that is, a bottom surface of the additive manufactured object) becomes a smooth and clean surface. The state of the surface of the treatment coating film was evaluated in three levels of "A": It was uniform almost without unevenness, "B": Slight unevenness was observed, but most part was smooth (practically usable), and "C": Unevenness was considerably observed, it was rough.

<Adhesion to Additive Manufacturing Object>

The degree of adherence between base and the additive manufactured object when the additive manufactured object was modeled over the treatment coating film prepared by the coating method was visually observed and evaluated. As a 3D printer, da Vinci 1.0 AiO (manufactured by XYZ Printing Japan Co., Ltd.) was used. As the resins used for manufacturing, an acrylonitrile-butadiene-styrene copolymer resin (ABS resin) and a polylactic acid resin (PLA resin) were used. In addition, as the 3D printer, Value 3D MagiX MF-1100 (manufactured by Mutoh Industries Co., Ltd.) was used. As the resins used for manufacturing, a polypropylene resin (PP resin) was used. When not being separated from the base from the beginning of manufacturing of the additive manufactured objects until the end of manufacturing thereof, it was determined that the adhesion was favorable. The degree of adherence of the additive manufactured object was evaluated in two levels of "A": Base and additive manufactured object were not separated from each other from the beginning of manufacturing until the end of manufacturing and "C": Base and additive manufactured object were separated from each other, at the beginning of manufacturing or during manufacturing.

<Separability from Additive Manufactured Object>

In those in which the additive manufactured object was not separated in evaluation of the <Adhesion to Additive Manufactured Object>, after the temperature of the base returns to a room temperature, the degree of separation between the base and the additive manufactured object is visually observed and evaluated ("C" in the <Adhesion> evaluation was not evaluated and described as "–"). When it is possible to easily separate the additive manufactured objects from the base, it was determined that the separability was favorable. The degree of separation between the base and the additive manufactured object was evaluated in three levels of "A": The additive manufactured object could be separated from base, only by pulling it so as to be lifted upward, "B": It could be separated from the base by dipping a space between the base and the additive manufactured object in water, and pulling the additive manufactured object so as to be lifted upward (practically no problem), and "C": The additive manufactured object could not be separated from the base even if water penetrated between the base and the manufactured object.

<Water Washability>

The degree of removal of the treatment coating film remaining on the base or the additive manufactured object was visually observed and evaluated. When the treatment coating film remaining on the base or the additive manufactured object could be easily separated or the remaining treatment coating film could be easily removed by wiping with water, it was determined that the water washability was favorable. The degree of cleaning was evaluated in two-levels of "A": The treatment coating film remaining on the base and the additive manufactured object could be easily separated or could be easily removed by wiping with water, and "C": The treatment coating film could not be easily separated, and it was difficult to remove it even when wiping with water, too.

According to Tables 1 and 2, it is clear that treatment agents for an additive manufacturing apparatus of Examples 1 to 12 are excellent in the surface smoothness, the adhesion to an additive manufactured object, the separability from an additive manufactured object, and the water washability, and is useful in improving the shaping accuracy of the additive manufactured object, improving stability, improving the separability, improving the cleanliness of the base and the additive manufactured object, designability, and the like. The treatment agents for an additive manufacturing apparatus using the water-soluble resin other than the resin having an oxazoline group of Comparative Examples 1 to 8 are favorable in the surface smoothness. However, in a case where the resin used for manufacturing is the ABS resin or the PP resin, adherence was poor from the beginning of manufacturing of the additive manufactured object, or it was separated from the base due to shrinkage in accordance with curing (solidification) of the modeled resin, during manufacturing. In the case of using such a treatment agent, it becomes necessary to select the manufacturing resin to be used. If the resin is erroneously selected, although it is not separated from the base during manufacturing, there is a high possibility of being shifted, and there is a possibility that the additive manufactured object cannot be precisely formed. In a case of using the treatment agent of Comparative Example 9, the surface smoothness and the adhesion to an additive manufactured object were favorable. However, even if water penetrated between the base and the additive manufactured object, it could not be separated. Although force was applied from every direction, the separability was poor. Therefore, the base and the additive manufactured object were broken. Also, the treatment coating film remaining over the base was poor in water washability and was very difficult to be removed.

Priority is claimed on Japanese Patent Application No. 2016-196075, filed on Oct. 4, 2016, the entire disclosure of which is incorporated herein.

The invention claimed is:

1. A treatment agent for an additive manufacturing apparatus which models an additive manufactured object, where the treatment agent is used for forming a water-soluble layer, where the water-soluble layer is interposed between a base and an additive manufactured object in an additive manufacturing apparatus, where the water-soluble layer bonds the base and the additive manufactured object to each other, and then is separated from the additive manufactured object,
   wherein the treatment agent is in the form of aqueous solution, and comprises:
   a resin having an oxazoline group; and
   a water,
   where the resin having an oxazoline group is water-soluble, and
   where the resin having an oxazoline group comprises an acrylic resin having an oxazoline group in a molecule of the acrylic resin, or styrene/acrylic resin having an oxazoline group in a molecule of the styrene/acrylic resin.

2. The treatment agent for an additive manufacturing apparatus according to claim 1, further comprising:
   a filler.

3. The treatment agent for an additive manufacturing apparatus according to claim 2,
   wherein the filler is at least one of an inorganic filler and an organic filler.

4. The treatment agent for an additive manufacturing apparatus according to claim 2,
   wherein the filler has an average particle diameter of 100 μm or less.

5. The treatment agent for an additive manufacturing apparatus according to claim 2,
   wherein the filler is in the amount of more than 0 and less than or equal to 200 parts by mass with respect to 100 parts by mass of the resin having an oxazoline group.

6. A method of using a treatment agent for an additive manufacturing apparatus, comprising:
   interposing the treatment agent for an additive manufacturing apparatus according to claim 1 between a base and an additive manufactured object, in an additive manufacturing apparatus that models an additive manufactured object, to bond the base and the additive manufactured object.

7. A method of using a treatment agent for an additive manufacturing apparatus, comprising:
   interposing the treatment agent for an additive manufacturing apparatus according to claim 1 between a base and an additive manufactured object, in an additive manufacturing apparatus that models an additive manufactured object, to bond the base and the additive manufactured object; and
   separating the treatment agent for an additive manufacturing apparatus from the base and the additive manufactured object by treating and dipping the treatment agent for an additive manufacturing apparatus with a water-soluble solvent.

8. A separating method by which a bonded portion where a base and an additive manufactured object are bonded using the treatment agent for an additive manufacturing apparatus according to claim 1, the method comprising:

treating and dipping the bonded portion with a water-soluble solvent.

9. A method of manufacturing an additive manufactured object, comprising:
a coating step of coating a base with the treatment agent for an additive manufacturing apparatus according to claim 1 to form a coating layer;
a step of drying the coating layer to form a treatment layer;
a step of laminating an additive manufacturing resin over the treatment layer to obtain an additive manufactured object; and
a step of separating the additive manufactured object from the base and the treatment layer.

10. The method of manufacturing an additive manufactured object according to claim 9,
wherein the step of separating the additive manufactured object from the base and the treatment layer includes a step of dissolving the treatment layer in a water-soluble solvent.

11. The treatment agent for an additive manufacturing apparatus according to claim 1, wherein the resin having an oxazoline group is in the amount of 1% to 99% by mass in a solid content.

12. A water-soluble treatment coating film which is used for forming an additive manufactured object including a resin having cure (solidification) shrinkage, where the treatment coating film is interposed between a base and an additive manufactured object, and the treatment coating bonds the base and the additive manufactured object to each other, and then is separated from the additive manufactured object,
wherein the treatment coating film comprises:
a resin having an oxazoline group,
where the resin having an oxazoline group is water-soluble, and
where the resin having an oxazoline group comprises an acrylic resin having an oxazoline group in a molecule of the acrylic resin, or styrene/acrylic resin having an oxazoline group in a molecule of the styrene/acrylic resin.

13. The treatment coating film according to claim 12, further comprising:
a filler.

14. The treatment coating film according to claim 13,
wherein the filler is at least one of an inorganic filler and an organic filler.

15. The treatment coating film according to claim 13,
wherein the filler has an average particle diameter of 100 µm or less.

16. The treatment coating film according to claim 13,
wherein the filler is in the amount of more than 0 and less than or equal to 200 parts by mass with respect to 100 parts by mass of the resin having an oxazoline group.

* * * * *